United States Patent
Butler (10) Patent No.: US 7,130,991 B1
(45) Date of Patent: Oct. 31, 2006

(54) METHOD AND APPARATUS FOR LOOP DETECTION UTILIZING MULTIPLE LOOP COUNTERS AND A BRANCH PROMOTION SCHEME

(75) Inventor: Michael G. Butler, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 434 days.

(21) Appl. No.: 10/682,551

(22) Filed: Oct. 9, 2003

(51) Int. Cl.
*G06F 9/38* (2006.01)

(52) U.S. Cl. ............... 712/241; 712/239; 712/233

(58) Field of Classification Search ........... 712/241, 712/239
See application file for complete search history.

(56) References Cited

U.S. PATENT DOCUMENTS

| | | | |
|---|---|---|---|
| 5,574,672 A * | 11/1996 | Briggs ............... | 708/209 |
| 5,909,573 A | 6/1999 | Sheaffer | |
| 6,003,128 A | 12/1999 | Tran | |
| 6,385,720 B1 | 5/2002 | Tanaka et al. | |
| 2004/0123075 A1 * | 6/2004 | Almog ............... | 712/207 |

OTHER PUBLICATIONS

Patel et al., Improving Trace Cache Effectiveness with Branch Promotion and Trace Packing, 1998, University of Michigan, p. 264-265.*

Haungs et al., "Branch Transition Rate: A New Metric for Improved Branch Classification Analysis", Proceedings HPCA, pp. 241-250, 2000.

Sherwood et al., "Loop Termination Prediction", Proceedings of the 3$^{rd}$ International Symposium on High Performance Computing (ISHPC2K), Oct. 2000, 14 pgs.

* cited by examiner

*Primary Examiner*—Eddie Chan
*Assistant Examiner*—George D. Zalepa
(74) *Attorney, Agent, or Firm*—Meyertons Hood Kivlin Kowert & Goetzel, P.C.; B. Noël Kivlin (57) ABSTRACT

A method and apparatus for loop detection for improved branch prediction accuracy. In one embodiment, the method may comprise executing a branch instruction, updating a plurality of event counts corresponding to the branch instruction in response to its executing, determining a loop behavior status corresponding to the branch instruction in response to the event count updating, and promoting the branch instruction to a loop branch prediction type in response to the determination of loop behavior status.

20 Claims, 4 Drawing Sheets

METHOD AND APPARATUS FOR LOOP DETECTION UTILIZING MULTIPLE LOOP COUNTERS AND A BRANCH PROMOTION SCHEME

BACKGROUND OF THE INVENTION

1. Field of the Invention

This invention relates to computer hardware and, more particularly, to branch prediction techniques.

2. Description of the Related Art

In many software applications, it may be necessary to iterate the same software steps a number of times to accomplish a particular program task. For example, a large array of variables may need to be initialized to a reset value before use, or a particular mathematical operation may need to be performed on each element of such an array. Rather than explicitly code each initialization or mathematical operation for each data element of such an array, a programmer may choose to employ a loop construct in a high-level programming language such as C or C++ to perform the operation over the whole data array iteratively, thereby potentially yielding more compact and efficient code.

For example, a programmer may code the operation to be performed on each data element in an abstract way, using an index variable to reference a particular data element. The programmer may then embed the abstract operation in an iterative loop, such as a C/C++ for-loop, to be executed a specific number of times, which number may also be referred to as the iteration count. The iteration count may for example be equal to the number of data elements to be processed. The iterative loop may also specify a counter variable to represent the current iteration number. Finally, the programmer may define a mapping from the current iteration number to the index variable used to reference a particular data element. For example, in a one-dimensional data array whose elements are indexed by integers, the current iteration number may map directly to the array index.

While executing, a loop construct may test the current iteration number against the iteration count to determine whether the end of the loop has been reached. For example, if the current iteration number is less than the iteration count, the loop may continue executing, while if the current iteration number is equal to the iteration count, the loop may terminate. The continued execution of the loop may thus be conditional, depending on the status of the current iteration number relative to the iteration count.

A loop construct coded in a high-level programming language may be translated into instructions of an instruction set architecture (ISA) that may be then executed by a microprocessor or system implementing that ISA. In some such translations, conditional branch instructions defined in the ISA may be used to implement the conditional behavior of loop execution. For example, various instructions may be used to test the value of the current iteration number, and a conditional branch instruction based on the results of the test may be used to branch to the beginning of the loop code sequence for another iteration, if necessary, or to execute code from another location if the loop has terminated.

A given microprocessor implementation may attempt to fetch instructions well in advance of their eventual execution, in order to allow for performance-improving features such as early decoding of instructions and instruction rescheduling or optimization based on run-time data availability, for example. However, a conditional branch instruction may present more than one potential fetch path, depending upon whether the branch is ultimately taken or not taken. Further, conditional branch outcome may not be known until the conditional branch actually executes. In order not to stall instruction fetching until a conditional branch's outcome is known, a microprocessor may implement a branch prediction scheme to predict the outcome of a given conditional branch and then speculatively fetch and execute instructions along the predicted path.

Branch prediction schemes may improve microprocessor performance to the extent that predictions are correct, but incorrect predictions may require that any speculatively executed instruction along the mispredicted path be discarded and the correct instruction path fetched and executed. Thus, branch prediction accuracy may substantially impact overall microprocessor performance. Conditional branches implementing loops may represent a substantial fraction of the total number of conditional branches in a given application program, but existing branch prediction schemes may not accurately predict the behavior of such loop conditional branches, thus potentially limiting overall branch prediction accuracy and microprocessor performance.

SUMMARY OF THE INVENTION

Various embodiments of a method and an apparatus for loop detection for improved branch prediction accuracy are disclosed. In one embodiment, the method may comprise executing a branch instruction, updating a plurality of event counts corresponding to the branch instruction in response to its executing, determining a loop behavior status corresponding to the branch instruction in response to the event count updating, and promoting the branch instruction to a loop branch prediction type in response to the determination of loop behavior status.

In one specific implementation, the method may further comprise determining a non-loop behavior status corresponding to the branch instruction in response to its promotion, and demoting the branch instruction to a non-loop branch prediction type in response to the determination of non-loop behavior status.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

System Overview

Figure 1:
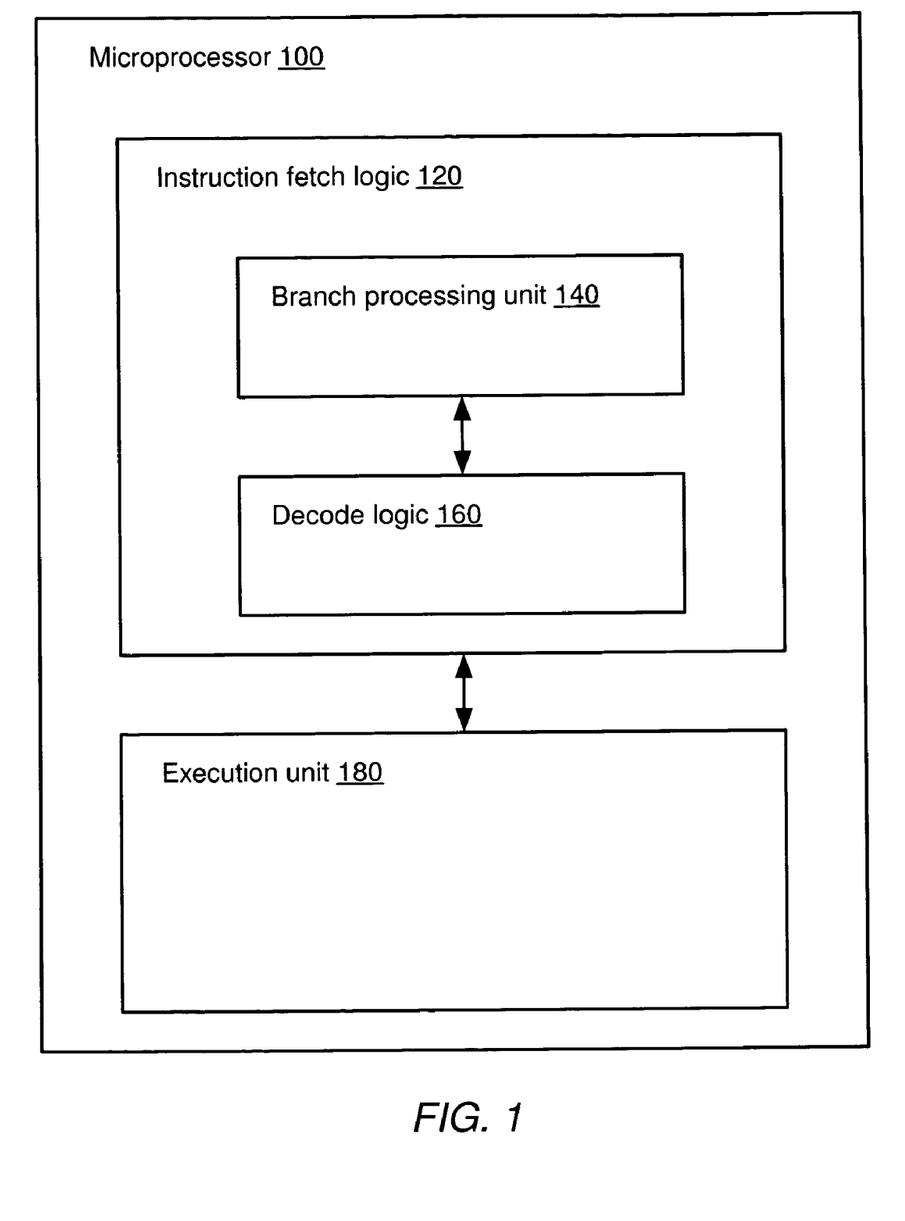
FIG. 1 is a block diagram illustrating one embodiment of an exemplary microprocessor.

Turning now to FIG. 1, a block diagram of one embodiment of an exemplary microprocessor is shown. Microprocessor 100 may be configured to execute instructions stored in a system memory (not shown). Many of these instructions may operate on data stored in the system memory. It is noted that the system memory may be physically distributed throughout a computer system and may be accessed by one or more microprocessors such as microprocessor 100, for example. In one embodiment, microprocessor 100 is an example of a microprocessor that implements the x86 architecture such as an Athlon™ processor, for example. However, other embodiments are contemplated that include other types of microprocessors.

In the illustrated embodiment, microprocessor 100 includes instruction fetch logic 120 coupled to execution unit 180. Execution unit 180 may be configured to execute instructions decoded by instruction fetch logic 120, such as arithmetic instructions or load/store instructions, for example. In one embodiment, execution unit 180 may include separate functional units (not shown), such as an arithmetic logic unit (ALU), a floating point unit (FPU), a load/store unit, or a combination of one or more of these. Execution unit 180 may also be configured to send status information to instruction fetch logic 120. For example, execution unit 180 may send status information regarding numeric faults or exceptions encountered during execution to instruction fetch logic 120 for processing.

In the illustrated embodiment, instruction fetch logic 120 includes branch processing unit 140 coupled to decode logic 160. In some embodiments, instruction fetch logic 120 may include an instruction cache (not shown). Alternatively, instruction fetch logic may be coupled to receive instructions from such a cache located elsewhere within microprocessor 100 or from another source, such as system memory. Instruction fetch logic 120 may be configured to coordinate the retrieval of instructions to be decoded and executed by making specific requests to fetch instructions located at a particular address in system memory. Instruction fetch logic 120 may be configured to store the addresses of currently executing instructions and to use such addresses to determine the addresses of specific instruction fetch requests. For example, instruction fetch logic 120 may be configured to determine the length of a given currently executing instruction, which coupled with the address of the given currently executing instruction may indicate the address of the next instruction to be fetched. Alternatively, as described below, instruction fetch logic 120 may speculatively fetch an arbitrary number of instruction bytes ahead of a currently executing instruction.

Decode logic 160 may be configured to decode one or more fetched instructions into a format suitable for controlling execution unit 180. For example, decode logic 160 may identify information in a given fetched instruction pertaining to the operation to be performed (such as add, subtract, load or store, for example) and represent such information separately from other information in a given fetched instruction pertaining to operands to be used (such as a specific register number or memory address). In some embodiments, instructions may be of varying complexity or length and may correspondingly require varying amounts of time or effort to decode. Therefore, in some embodiments, the operation of decode logic 160 may be staged over a period of time, or pipelined. In such embodiments, instruction fetch logic 120 may be configured to sequentially fetch a number of instruction bytes ahead of an instruction being decoded, thereby keeping the decode pipeline full.

Some of the instructions fetched by instruction fetch logic 120 may be branch instructions, which when executed may cause the next executed instruction to be fetched from a specified address, rather than the address sequentially following the branch instruction. Some branch instructions (unconditional branches) may unconditionally cause the next executed instruction to be fetched from the specified address. In contrast, the behavior of conditional branch instructions may depend on a condition, such as the result of a previous operation or the value of an operand, for example. In one embodiment, if the specified condition is satisfied, the conditional branch may cause the next executed instruction to be fetched from the specified address. If the specified condition is not satisfied, execution may sequentially continue from the address following the conditional branch instruction. In an alternative embodiment, the actions taken in response to evaluation of the specified condition may be reversed.

In one embodiment, branch processing unit 140 may be configured to execute branch instructions and alter the sequence of fetched instructions accordingly. In another embodiment, branches may be executed in an execution unit such as execution unit 180, which may be configured to communicate the results of branch execution to branch processing unit 140. For unconditional branches, branch processing unit 140 may be configured to cause the specified fetch address to be substituted for the sequential fetch address. If the unconditional branch is detected sufficiently far in advance of the instruction currently being decoded or executed, instruction fetch logic 120 may begin fetching instructions from the specified address before older instructions in the pipeline have finished decoding or execution, thereby preventing a stall condition where execution unit 180 may be idle and waiting for new instructions. However, for conditional branches, even if the branch is detected well in advance, the condition the branch specifies may not be known early enough to prevent a stall. For example, the conditional branch instruction may immediately follow the instruction producing the result on which the conditional branch instruction depends. In such a case, as described further below in conjunction with FIG. 2, branch processing unit 140 may be configured to predict the path the conditional branch will take, and to cause instruction fetch logic 120 to fetch instructions corresponding to the predicted outcome.

Branch Processing Unit

Figure 2:
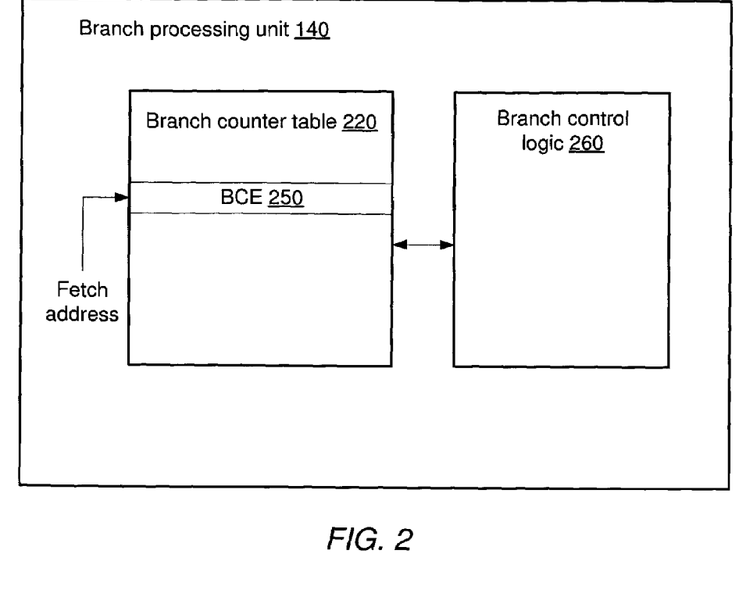
FIG. 2 is a block diagram illustrating one embodiment of a branch processing unit.

Turning now to FIG. 2, a block diagram illustrating one embodiment of a branch processing unit is shown. In the illustrated embodiment, branch processing unit 140 includes branch counter table 220 coupled to branch control logic 260. Branch counter table 220 includes a plurality of entries such as branch counter entry (BCE) 250, which may be indexed by a fetch address coupled to branch counter table 220.

Branch processing unit 140 may be configured to detect conditional branches and predict whether a given conditional branch will be taken or not taken (i.e., whether the condition specified by a given conditional branch will be satisfied or not). One possible branch prediction strategy may be referred to herein as static prediction. In a static branch prediction algorithm, branch history may not be taken into account when making the prediction. For example, studies of application traces may show that a majority of backward conditional branches (i.e., conditional branches that, when taken, decrement the fetch address by some quantity) are taken, or that a majority of conditional branches with a given target address are not taken. In such a case, branch processing unit 140 may employ a static prediction algorithm such that backward conditional branches are always predicted to be taken, and conditional branches with a given target address are always predicted to be not taken. Performance may be improved to the extent that the static prediction algorithm is correct.

Another possible branch prediction strategy may be referred to herein as dynamic prediction. In a dynamic branch prediction algorithm, some aspect of the execution history of a given branch may be taken into account when predicting the outcome of a conditional branch. For example, in one dynamic prediction strategy, conditional branches with a recent execution history of having been taken may be predicted to be taken, while conditional branches with a recent execution history of having not been taken may be predicted to be not-taken. In some embodiments, branch processing unit 140 may be configured to store branch history information for each of a plurality of branches, such as bit vectors or counters reflecting the taken vs. not-taken status of a given branch over a given number of recent branch executions. Such stored branch history information may then be used to predict the outcome of a given conditional branch in accordance with a particular branch prediction algorithm. It is noted that in some embodiments, branch processing unit 140 may employ more than one branch prediction algorithm, and may employ a combination of static and dynamic prediction algorithms.

In the illustrated embodiment, branch counter table 220 may store branch history information as well as other status information pertaining to a given branch in each of a plurality of respective entries such as branch counter entry 250. In one embodiment, branch counter table 220 may be indexed by a number of bits of the fetch address corresponding to the number of entries included in branch counter table 220. For example, in one embodiment branch counter table 220 may include 1024 (i.e., $2^{10}$) entries and may be indexed by the ten least significant bits of the fetch address. In other embodiments, it is contemplated that different numbers of entries may be provided, that different numbers of fetch address bits may be used to index the table, and that functions of address bits (such as hashing functions, for example) may be used to index the table. In an alternative embodiment, branch counter table 220 may be implemented as a content addressable memory (CAM)-type structure, in which a fetch address of a given branch may be stored with each entry, and the appropriate entry selected by matching each stored address against the fetch address of a branch for which prediction is required.

It is noted that in some embodiments, the fetch address used to index or match entries in branch counter table 220 may correspond exactly to the memory address of a given branch instruction, while in other embodiments, the fetch address may correspond to an address of a fetch block containing a given branch instruction. For example, in one embodiment, instruction fetch logic 120 may be configured to fetch instructions in 8-byte fetch blocks that are aligned on 8-byte address boundaries. In such an embodiment, entries in branch counter table 220 may be indexed based on the address of the beginning of the 8-byte fetch block that includes the corresponding branch instruction, rather than the address of the branch instruction itself. In other embodiments, it is contemplated that entries in branch counter table 220 may be indexed or matched using other address values or other methods.

Branch control logic 260 may be configured to allocate or initialize entries in branch counter table 220. For example, in one embodiment, branch control logic 260 may be configured to reset the branch history or status information stored in a particular entry, such as branch counter entry 250, when that particular entry is first associated with a given branch instruction. Branch control logic 260 may also be configured to utilize branch history or status information stored in a given entry of branch counter table 220 to predict the outcome of an associated branch instruction. For example, in one embodiment, the fetch address of a given branch instruction may be used to index branch counter table 220. Branch counter table 220 may subsequently provide stored history information for the given branch instruction to branch control logic 260. Branch control logic 260 may then utilize the received history information in conjunction with a particular dynamic branch prediction algorithm to predict the outcome of the given branch instruction. It is noted that in alternative embodiments, the functions of branch control logic 260 may be integrated into branch counter table 220 or into one or more entries of branch counter table 220.

Branch Counter Entry

Figure 3:
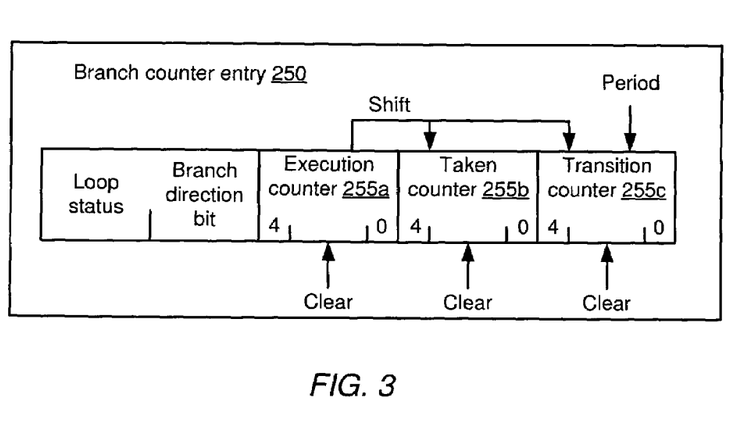
FIG. 3 is a block diagram illustrating one embodiment of a branch counter entry.

Referring now to FIG. 3, a block diagram illustrating one embodiment of a branch counter entry is shown. Branch counter entry 250 includes a plurality of counters designated execution counter 255a, taken counter 255b, and transition counter 255c, which may be referred to collectively herein as counters 255. Each counter 255 is coupled to a respective clear signal, and execution counter 255a is coupled to each of taken counter 255b and transition counter 255c via a shift signal. Transition counter 255c is coupled to receive a loop period value denoted "period." Branch counter entry 250 also includes a loop status bit field as well as a branch direction bit. In an alternative embodiment, branch counter entry 250 may include a branch index value (not shown).

Counters 255 may be configured to store history information pertaining to a given branch instruction corresponding to branch counter entry 250. The stored history information may be used by a dynamic branch prediction algorithm to predict the outcome of a given branch instruction. In the illustrated embodiment, each of counters 255 stores a five-bit counter value, although other embodiments are contemplated in which each of counters 255 may store a counter value comprising a different number of bits. Execution counter 255a may be configured to increment its stored value, which may be referred to herein as a branch execution count and denoted $C_{exec}$, whenever the corresponding branch instruction executes. Taken counter 255b may be configured to increment its stored value, which may be referred to herein as a branch taken count and denoted $C_{taken}$, whenever the corresponding branch instruction is actually taken. Transition counter 255c may be configured to increment its stored value, which may be referred to herein as a branch transition count and denoted $C_{transition}$, whenever the corresponding branch instruction transitions from taken to not-taken, or from not-taken to taken, during successive executions. In one embodiment, the stored value in each of counters 255 may be cleared to zero when the respective clear signal is asserted.

In one embodiment, each of counters 255 may be implemented as a hardware incrementor, and the associated clear, shift, and period signals may be implemented within the incrementor logic. However, it is contemplated that in an alternative embodiment, each counter 255 may comprise a plurality of storage locations such as register cells or RAM cells, for example, and each branch counter entry 250 may comprise an entry in a storage array such as a register file or RAM array, for example. In such an embodiment, the modification of values stored in each counter 255 and each other field of branch counter entry 250 may be performed by other logic, such as branch counter logic 260. For example, the contents of a given branch counter entry 250 could be accessed as described above, modified as appropriate by branch counter logic 260, and then written back to the relevant branch counter entry 250 within branch counter table 220.

Loop Relations

Loop constructs in software, wherein a sequence of instructions is repeated a specified number of times, may be implemented through the use of conditional branch instructions. Such loops may be useful for implementing algorithms that iterate or must wait for a synchronization event to occur before continuing, for example. In one embodiment of such a loop, a counter variable in a register or memory location may be initialized with the number of loop iterations to be performed and decremented once during each iteration. At the end of each iteration, the counter variable may be tested to determine whether the loop has terminated, and a conditional branch may use the result of the counter variable test to determine whether to branch back to the beginning of the loop iteration or to allow processing to proceed beyond the loop code. For example, if the counter variable is nonzero, the conditional branch may be taken and thereby cause execution to continue from the beginning of the loop iteration, while if the counter variable is zero, the conditional branch may not be taken, causing execution to continue from the instruction following the conditional branch instruction. As used herein, a loop invocation refers to a single instance of a loop commencing, iterating a specific number of times, and exiting. In a loop embodiment such as the foregoing example, the conditional branch may be taken one or more times and not taken once per loop invocation. Loops that exhibit this pattern of conditional branch behavior may be referred to herein as taken-dominant loops.

In an alternative embodiment of a loop, the counter variable may be tested at the beginning of the loop, and a conditional branch instruction may use the result of the test to determine whether to branch out of the loop to another portion of code or to allow processing to proceed into the body of the loop code. For example, if the counter variable is nonzero, the conditional branch may not be taken, thereby causing execution to continue from instruction following the conditional branch instruction, while if the counter variable is zero, the conditional branch may be taken, causing execution to continue from a different portion of code. An unconditional branch may be used at the end of the loop code to unconditionally branch back to the beginning of the loop code. In such a loop embodiment, the conditional branch may be not-taken one or more times and taken once per loop invocation. Loops that exhibit this pattern of conditional branch behavior may be referred to herein as not-taken-dominant loops. It is noted that in other embodiments, the code structure of taken-dominant and not-taken-dominant loops including the exact positioning of conditional branch instructions may vary. For example, in some embodiments, a branch instruction may have one or more delay slots following the branch and configured such that each instruction occupying a delay slot may execute after the branch instruction executes but before the branch takes effect.

Once invoked, loops may execute for a number of iterations corresponding to the loop count. The number of iterations executed by a given invocation of a loop may be referred to herein as the loop period, or simply period. In general, a conditional branch implementing a loop (i.e., a conditional branch that determines whether to continue iteration or to exit, also referred to herein as a loop branch) may exhibit well-defined relationships among its counter values $C_{exec}$, $C_{taken}$, and $C_{transition}$. Specifically, for taken-dominant loops, the corresponding loop branch may be not-taken once per loop period. Thus, for a given taken-dominant loop branch, $$C_{taken} = C_{exec} - N_{periods}, \quad (1)$$

where $N_{periods}$ denotes the number of loop periods (i.e., the total number of invocations of the loop). Further, for taken-dominant loops, the corresponding loop branch may transition twice per loop period (i.e., from taken to not-taken at the end of a given loop period, then to taken at the beginning of a subsequent loop period). Thus, for a given taken-dominant loop branch, $$C_{transition} = 2 \cdot N_{periods}. \quad (2)$$

Solving for $N_{periods}$ and substituting yields $$C_{exec} = C_{taken} + ceil(C_{transition}/2), \quad (3)$$

where ceil(N) computes the smallest integer greater than or equal to N. Further, the loop period P may be given by $$P = C_{exec}/ceil(C_{transition}/2). \quad (4)$$

For not-taken-dominant loop branches, (3) may be rewritten using $C_{not-taken}$ along with the relation $$C_{exec} = C_{taken} + C_{not-taken} \quad (5)$$

to obtain $$C_{taken} = ceil(C_{transition}/2). \quad (6)$$

Loop Promotion/Demotion

Using the above results, if during the course of execution of a given branch, counters 255 associated with the given branch are in the relation given by (3), the given branch may be considered to be a taken-dominant loop branch. Similarly, if counters 255 are in the relation given by (6), the given branch may considered to be a not-taken-dominant loop branch. For example, a given branch instruction may have the following execution history: TTTNTTTN, where T indicates the branch instruction was taken, and N indicates it was not taken. In this case, $C_{exec}=8$, $C_{taken}=6$, and $C_{transition}=3$. These values satisfy relation (3), so this branch instruction may be considered to be a taken-dominant loop branch with period P=4. It is noted that branches for which $C_{taken}=C_{not-taken}$ may in some cases satisfy both relations (3) and (6) and may be considered either taken-dominant or not-taken-dominant loop branches.

Figure 4:
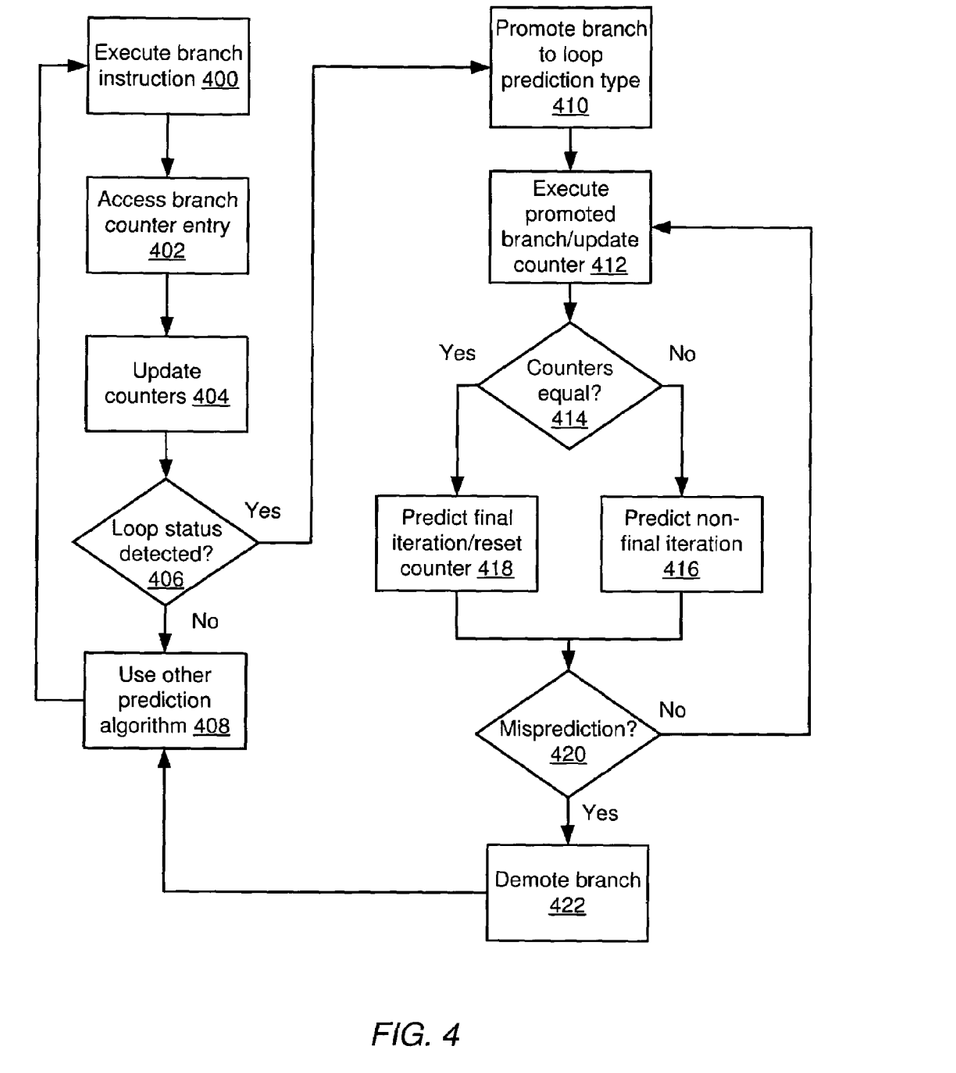
FIG. 4 is a flow diagram illustrating the operation of loop promotion and demotion in one embodiment of a branch processing unit.

FIG. 4 is a flow diagram illustrating the operation of loop promotion and demotion in one embodiment of a branch processing unit. Referring collectively to FIG. 2 through FIG. 4, operation begins in block 400 where a branch instruction is executed. In response to execution of the branch instruction, branch counter entry 250 corresponding to the branch instruction may be accessed in branch counter table 220 (block 402). Counters 255 of the accessed branch counter entry 250 may be updated as indicated by the execution status of the branch instruction. For example, execution counter 255a may increment, and if the branch instruction was taken and/or transitioned, taken counter 255b and/or transition counter 255c may increment, respectively (block 404).

In one embodiment, once the particular branch counter entry 250 associated with the branch instruction has been accessed and counters 255 have been appropriately incremented, branch control logic 260 may test counters 255 to determine a loop behavior status. In one embodiment, loop behavior status may be confirmed if either relation (3) or (6) is satisfied, while in other embodiments additional criteria may be employed as described in detail below (block 406). In another embodiment, branch control logic 260 may determine a loop behavior status only if the given branch instruction was mispredicted by another branch prediction algorithm. It is noted that in one embodiment, access of branch counter entry 250 and incrementing of counters 255 may occur in response to execution of a branch instruction, while access of branch counter entry 250 and determination of a loop behavior status may occur separately in response to fetch of that branch instruction.

If loop behavior status for the branch instruction is not confirmed, branch control logic 260 may select another branch prediction algorithm to be applied to the branch instruction (block 408). If branch control logic 260 confirms loop behavior status for the branch instruction, it may compute the loop period according to relation (4) and promote the branch instruction to a loop branch prediction type (block 410). Specifically, in promoting the branch instruction, branch control logic 260 may clear execution counter 255a via that counter's associated clear signal, and may cause the computed loop period to be stored in transition counter 255c. (In an alternative embodiment, branch control logic 260 may cause the computed loop period to be stored in taken counter 255b.) Branch control logic 260 may assert a bit in the loop status bit field of branch counter entry 250 to indicate that the corresponding branch instruction has been promoted to a loop branch prediction type, and may also configure the branch direction bit of branch counter entry 250 to indicate whether the corresponding branch instruction is taken-dominant (in one embodiment, indicated by a logic 1) or not-taken-dominant (in one embodiment, indicated by a logic 0).

In one embodiment, upon each execution of the promoted loop branch instruction (i.e., a given branch instruction that has been promoted to a loop branch prediction type, as indicated by the corresponding loop status bit field), execution counter 255a in the corresponding branch counter entry 250 may be incremented. In an alternative embodiment, execution counter 255a may be incremented when the corresponding promoted loop branch is fetched (block 412). In response to such incrementing, branch control logic 260 may compare the value of execution counter 255a against the stored loop period in transition counter 255c (block 414). If the values are not equal, branch control logic 260 may predict that the current loop iteration is not the final iteration, and may predict the branch instruction to be taken or not-taken if the corresponding branch direction bit indicates a taken-dominant or not-taken-dominant loop branch, respectively (block 416). If the values are equal, branch control logic 260 may predict that the current loop iteration is the final iteration, and may predict the branch instruction to be not-taken or taken if the corresponding branch direction bit indicates a taken-dominant or not-taken-dominant loop branch, respectively. Also, if the values are equal, branch control logic 260 may clear execution counter 255a via that counter's associated clear signal in anticipation of the next invocation of the associated loop (block 418).

As noted above, in one embodiment loop behavior status of a given branch may be confirmed if either relation (3) or (6) is satisfied at any time during the history of execution of the branch, while in another embodiment loop behavior status may be confirmed only if either relation (3) or (6) is satisfied and the branch has been mispredicted by another branch prediction algorithm. It is noted that in the former embodiment, promotion to a loop branch prediction type may occur during the middle of a loop period. In an embodiment that clears execution counter 255a upon promotion of the associated branch, promotion during the middle of a loop period may result in a misprediction at the end of the first loop period following promotion, since the current loop iteration count stored in execution counter 255a may be out of synchronization with the computed loop period. In such an embodiment, execution counter 255a may, for example, be cleared again upon the first misprediction of the associated branch following promotion of that branch to a loop branch prediction type, thereby synchronizing the current loop iteration count with the loop period.

In an alternative embodiment, if a branch is promoted to a loop branch prediction type during the middle of a loop period, branch control logic 260 may use the values of counters 255 at the time of promotion to estimate the current loop iteration at the time of promotion and may load execution counter 255a with the estimated value, rather than clearing it. Such an alternative embodiment may reduce the likelihood that the current loop iteration count is out of synchronization with the loop period after promotion, thereby reducing the chances of a branch misprediction shortly after promotion. Further, in an embodiment where loop behavior status may be confirmed only if either relation (3) or (6) is satisfied and the branch has been mispredicted by another branch prediction algorithm, promotion to a loop branch prediction type may be more effectively synchronized with the boundary of the loop period, and neither an additional clearing of execution counter 255a to synchronize the current loop iteration count with the loop period nor an attempt to estimate the current loop iteration value at promotion may be necessary.

Once a branch has been promoted to a loop branch prediction type, it may fail to exhibit the expected loop behavior. For example, the loop count of the associated loop may change during program execution, causing the actual loop period to diverge from the period computed at the time the loop branch was promoted. Consequently, branch control logic 260 may mispredict the outcome of a promoted loop branch (block 420). In the absence of a misprediction, operation of the promoted loop branch may continue from block 412. If a misprediction of a promoted loop branch occurs, branch control logic 260 may determine a non-loop behavior status of the corresponding loop branch instruction. In such an embodiment, branch control logic 260 may then demote the loop branch instruction to a non-loop branch prediction type by resetting the loop status bit field of the corresponding branch counter entry 250 (block 422). In some embodiments, upon loop branch demotion, branch control logic 260 may also clear each of counters 255. After being demoted, the branch instruction may be predicted by various non-loop branch prediction algorithms depending on the embodiment of branch processing unit 140 (block 408).

A promoted loop branch may also fail to exhibit the expected loop behavior due to improper promotion. For example, counters 255 associated with a given branch instruction may have satisfied relations (3) or (6) due to random branch behavior, without any underlying loop structure present. In particular, when a computed loop period for a promoted loop branch is relatively short (e.g., 2 or 3), the branch may be more likely to have been improperly promoted based on random branch behavior. Consequently, branch control logic 260 may be configured to employ additional criteria to confirm loop behavior status at block 406, as follows.

In one embodiment, branch control logic 260 may compute the number of detected loop periods according to relations (1) or (2). If the number of periods exceeds a particular threshold, branch control logic 260 may confirm loop behavior status and promote the associated branch instruction. If the number of periods does not exceed the threshold, branch control logic 260 may not promote the associated branch instruction. In one embodiment, branch control logic 260 may store a loop status confidence level associated with a given branch instruction in the loop status bit field of branch counter 250 associated with that branch instruction. For example, branch control logic 260 may store the number of loop periods detected in the loop status bit field, and may subsequently use this value in addition to other factors to determine whether to promote the associated branch instruction to a loop branch prediction type. In one embodiment, branch control logic 260 may use the number of loop periods in conjunction with the value of the loop period to determine loop behavior status and consequent promotion to a loop branch prediction type. For example, branch control logic 260 may be configured to require more periods detected in order to promote a branch having a smaller period value, and to require fewer periods detected in order to promote a branch having a larger period value.

Counter Overflow and Aging

Any finite counter, such as each of counters 255, may have the potential to overflow if the stored value is incremented beyond the largest number the counter is configured to represent. For example, in the embodiment illustrated in FIG. 3, execution counter 255a stores a 5-bit branch execution count. In such an embodiment, the largest unsigned number execution counter 255a may represent is 11111b, or 31. If this value is stored in execution counter 255a and an increment occurs, execution counter 255a may overflow.

Figure 5:
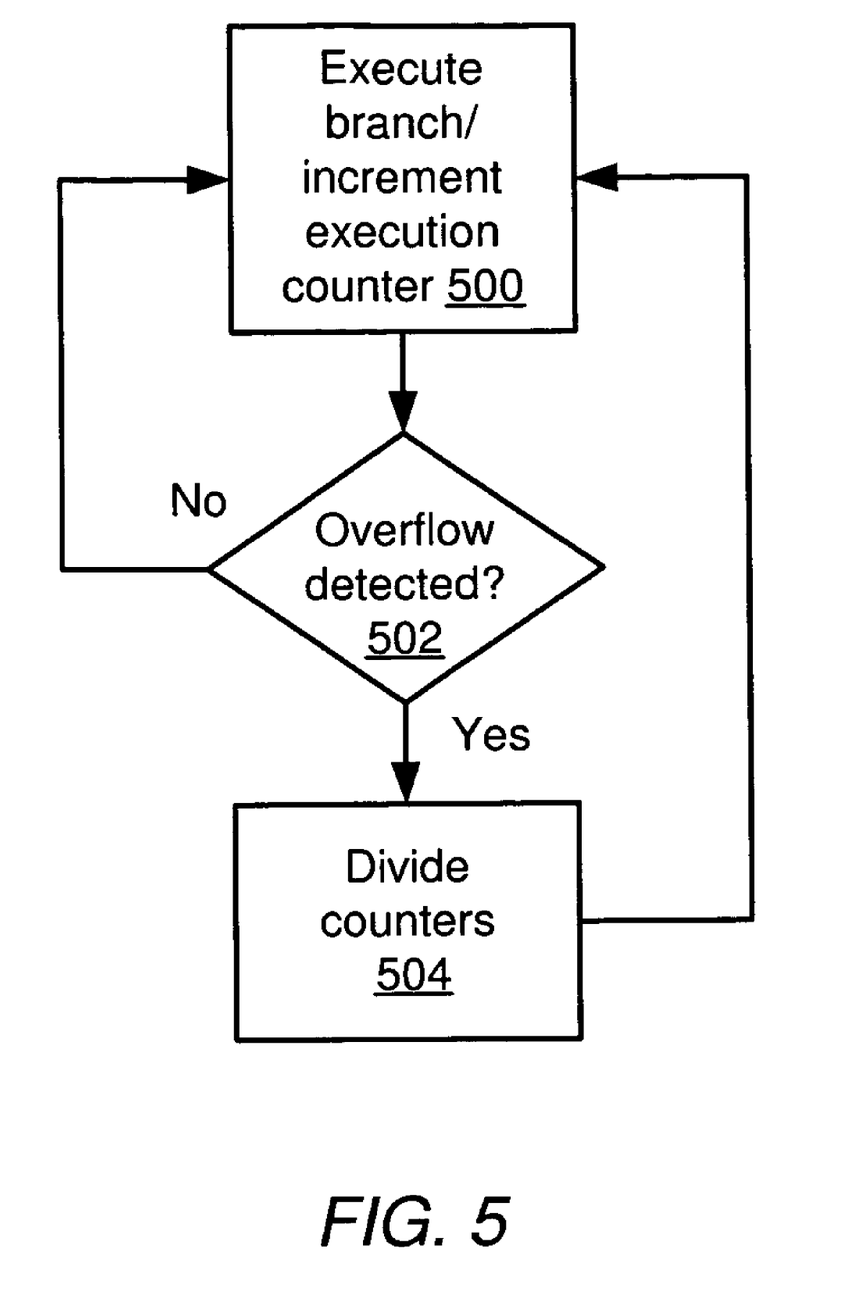
FIG. 5 is a flow diagram illustrating counter overflow processing in one embodiment of a branch processing unit.

FIG. 5 is a flow diagram illustrating counter overflow processing in one embodiment of a branch processing unit. Referring collectively to FIG. 3 and FIG. 5, operation begins in block 500 where execution counter 255a is incremented in response to execution of a corresponding branch instruction. Incrementing execution counter 255a may cause it to overflow, which may be detected (block 502). If no overflow is detected, operation may continue from block 500. If an overflow is detected, execution counter 255a may be configured to detect the overflow and to divide the stored branch execution count by a given value, as well as to direct taken counter 255b and transition counter 255c to divide their respective stored values by the same given value (block 504). In one embodiment, the given value may be two, in which case execution counter 255a may perform the divide by performing a logical shift right operation on the stored branch execution count by one bit position. In such an embodiment, execution counter 255a may also direct taken counter 255b and transition counter 255c to perform a 1-bit logic shift right operation on their respective stored values by means of the "shift" signal. After the division is performed, operation may continue from block 500.

In one embodiment, the branch execution count may be inclusive of the branch taken count and the branch transition count. That is, in such an embodiment, for a branch to be taken or transition, it may execute. Therefore, in such an embodiment, the branch execution count may increment at least as rapidly as the branch taken count and branch transition count. Consequently, overflow detection may be performed only for execution counter 255a.

Dividing each of counters 255 by a given value when one counter overflows is a linear operation on counters 255 and thus may preserve the relationships among them. Specifically, if counters 255 corresponding to a given branch operation satisfied relations (3) or (6) prior to the division, they may continue to satisfy relations (3) or (6) after the division. Thus, loop behavior status determination and promotion may not be affected by such a division operation after a counter overflows. Further, such division may have the effect of reducing the influence of or "aging out" old branch behavior. For example, in one embodiment a given branch may be taken a large number of times in succession, resulting in a large branch taken count. Thereafter, the given branch may be executed but not taken a large number of times in succession. The large branch taken count may therefore not be indicative of the given branch's recent execution history. However, if the given branch continues executing and execution counter 255a overflows, the branch taken count (as well as the other counts) may be divided in half, reducing its relative contribution to the recent execution history of the given branch. If the given branch continues to execute without being taken such that execution counter 255a overflows a sufficient number of times, the branch taken count may be reduced to zero through successive division operations.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

executing a branch instruction;

updating a plurality of event counts corresponding to said branch instruction in response to said executing;

determining a loop behavior status corresponding to said branch instruction in response to said updating; and promoting said branch instruction to a loop branch prediction type in response to said determining a loop behavior status;

wherein said plurality of event counts comprises a branch execution count, a branch taken count, and a branch transition count; and wherein said determining a loop behavior status comprises detecting the relationship $C_{exec} = C_{taken} + \text{ceil}(C_{transition}/2)$ in response to a branch misprediction, wherein $C_{exec}$ corresponds to said branch execution count, $C_{taken}$ corresponds to said branch taken count, and $C_{transition}$ corresponds to said branch transition count, and wherein ceil(N) specifies a smallest integer greater than or equal to N.

2. The method as recited in claim 1, further comprising:

determining a non-loop behavior status corresponding to said branch instruction in response to said promoting; and demoting said branch instruction to a non-loop branch prediction type in response to said determining a non-loop behavior status.

3. The method as recited in claim 1, wherein said promoting comprises:

clearing said branch execution count;

computing a loop period value; and storing said loop period value.

4. The method as recited in claim 3, further comprising:

incrementing said branch execution count in response to an execution of said branch instruction;

comparing said branch execution count to said stored loop period value; and predicting a final loop iteration in response to said comparing.

5. The method as recited in claim 2, wherein said determining a non-loop behavior status comprises detecting a branch misprediction.

6. The method as recited in claim 2, wherein said demoting comprises selecting a non-loop branch prediction technique corresponding to said branch instruction.

7. The method as recited in claim 1, further comprising:
detecting an overflow of said branch execution count; and
dividing each of said branch execution count, said branch taken count, and said branch transition count by a given value in response to said detecting an overflow.

8. The method as recited in claim 7, wherein each of said branch execution count, said branch taken count, and said branch transition count is represented as a binary number, and wherein said dividing comprises a logical right shift operation by one or more binary digit positions.

9. A branch processing unit comprising:
a plurality of event counters corresponding to a branch instruction and configured to be updated in response to execution of said branch instruction; and
branch control logic coupled to said plurality of event counters, wherein said branch control logic is configured to determine a loop behavior status corresponding to said branch instruction in response to said updating and further configured to promote said branch instruction to a loop branch prediction type in response to said determining a loop behavior status;
wherein said plurality of event counters comprises a branch execution counter, a branch taken counter, and a branch transition counter, each configured to store a respective value; and
wherein to determine said loop behavior status, said branch control logic is further configured to detect the relationship $C_{exec}=C_{taken}+\text{ceil}(C_{transition}/2)$ in response to a branch misprediction, wherein $C_{exec}$ corresponds to a value stored in said branch execution counter, $C_{taken}$ corresponds to a value stored in said branch taken counter, and $C_{transition}$ corresponds to a value stored in said branch transition counter, and wherein ceil(N) specifies a smallest integer greater than or equal to N.

10. The branch processing unit as recited in claim 9, wherein said branch control logic is further configured to determine a non-loop behavior status corresponding to said branch instruction in response to said promoting and to demote said branch instruction to a non-loop branch prediction type in response to said determining a non-loop behavior status.

11. The branch processing unit as recited in claim 9, wherein to promote said branch instruction, said branch control logic is further configured to:
clear said branch execution counter;
clear a loop period value; and
store said loop period value in one of said branch taken counter or said branch transition counter.

12. The branch processing unit as recited in claim 11, wherein said branch execution counter is configured to increment in response to an execution of said branch instruction; and
wherein said branch control logic is configured to compare a value stored in said branch execution counter to said stored loop period value and to predict a final loop iteration in response to said comparing.

13. The branch processing unit as recited in claim 10, wherein to determine a non-loop behavior status, said branch control logic is further configured to detect a branch misprediction.

14. The branch processing unit as recited in claim 10, wherein to demote said branch instruction, said branch control logic is further configured to select a non-loop branch prediction technique corresponding to said branch instruction.

15. The branch processing unit as recited in claim 9, wherein said branch execution counter is further configured to detect an overflow, and wherein each of said branch execution counter, said branch taken counter, and said branch transition counter is configured to divide said respective stored value by a given value in response to said detecting an overflow.

16. The branch processing unit as recited in claim 15, wherein each said respective stored value comprises a binary number, and wherein said dividing comprises a logical right shift operation by one or more binary digit positions.

17. A microprocessor comprising:
an execution unit configured to execute instructions; and
a branch processing unit coupled to said execution unit and configured to:
update a plurality of event counts corresponding to a branch instruction in response to execution of said branch instruction;
determine a loop behavior status corresponding to said branch instruction in response to said updating; and
promote said branch instruction to a loop branch prediction type in response to said determining a loop behavior status;
wherein said plurality of event counts comprises a branch execution count, a branch taken count, and a branch transition count, and
wherein to determine said loop behavior status, said branch prediction unit is further configured to detect the relationship $C_{exec}=C_{taken}+\text{ceil}(C_{transition}/2)$ in response to a branch misprediction, wherein $C_{exec}$ corresponds to said branch execution count, $C_{taken}$ corresponds to said branch taken count, and $C_{transition}$ corresponds to said branch transition count, and wherein ceil(N) specifies a smallest integer greater than or equal to N.

18. The microprocessor as recited in claim 17, wherein said branch prediction unit is further configured to:
determine a non-loop behavior status corresponding to said branch instruction in response to said promoting; and
demote said branch instruction to a non-loop branch prediction type in response to said determining a non-loop behavior status.

19. The microprocessor as recited in claim 17, wherein to promote said branch instruction, said branch prediction unit is further configured to:
clear said branch execution count;
compute a loop period value; and
store said loop period value.

20. The microprocessor as recited in claim 19, wherein said branch prediction unit is further configured to:
increment said branch execution count in response to an execution of said branch instruction;
compare said branch execution count to said stored loop period value; and
predict a final loop iteration in response to said comparing.

* * * * *